(12) United States Patent
Hu et al.

(10) Patent No.: US 10,164,399 B2
(45) Date of Patent: Dec. 25, 2018

(54) MID-INFRARED CASCADING FIBER AMPLIFIER AND METHOD FOR AMPLIFICATION THEREOF

(71) Applicants: Baylor University, Waco, TX (US); University of Maryland Baltimore County, Baltimore, MD (US)

(72) Inventors: Jonathan Hu, Woodway, TX (US); Curtis R. Menyuk, Silver Spring, MD (US)

(73) Assignees: BAYLOR UNIVERSITY, Waco, TX (US); UNIVERSITY OF MARYLAND BALTIMORE COUNTY, Baltimore, MD (US)

(*) Notice: Subject to any disclaimer, the term of this patent is extended or adjusted under 35 U.S.C. 154(b) by 0 days.

(21) Appl. No.: 15/557,388

(22) PCT Filed: Mar. 11, 2016

(86) PCT No.: PCT/US2016/022093
§ 371 (c)(1),
(2) Date: Sep. 11, 2017

(87) PCT Pub. No.: WO2016/200453
PCT Pub. Date: Dec. 15, 2016

(65) Prior Publication Data
US 2018/0115135 A1    Apr. 26, 2018

Related U.S. Application Data
(60) Provisional application No. 62/133,238, filed on Mar. 13, 2015.

(51) Int. Cl.
*G02F 2/02* (2006.01)
*G02F 1/35* (2006.01)
(Continued)

(52) U.S. Cl.
CPC ........ *H01S 3/06762* (2013.01); *G02F 1/3523* (2013.01); *H01S 3/094003* (2013.01);
(Continued)

(58) Field of Classification Search
None
See application file for complete search history.

(56) References Cited

U.S. PATENT DOCUMENTS

| | | | | |
|---|---|---|---|---|
| 5,309,452 A | * | 5/1994 | Ohishi | H01S 3/06708 372/6 |
| 5,629,953 A | * | 5/1997 | Bishop | H01S 3/17 372/39 |
| 5,936,762 A | * | 8/1999 | Samson | H01S 3/06716 359/337.3 |
| 6,015,765 A | * | 1/2000 | Harbison | C03C 3/321 501/37 |
| 6,236,496 B1 | * | 5/2001 | Yamada | H01S 3/06708 359/341.33 |

(Continued)

*Primary Examiner* — Rhonda S Peace
(74) *Attorney, Agent, or Firm* — Jackson Walker LLP; Christopher J. Rourk

(57) ABSTRACT

A mid-infrared cascading fiber amplifier device having a source configured to generate a first electromagnetic wave output at a first frequency, a fiber coupled to the source and a pump coupled to the fiber and configured to generate a second electromagnetic wave output at a second frequency, wherein the second frequency is higher than the first frequency and causes the fiber to undergo two or more transitions in response to stimulation by the first electromagnetic wave output at the first frequency, wherein the first transition generates the first electromagnetic wave output approximately at the first frequency and the second transition generates the first electromagnetic wave output approximately at the first frequency.

19 Claims, 5 Drawing Sheets

(51) Int. Cl.
  *H01S 3/067*  (2006.01)
  *H01S 3/094*  (2006.01)
  *H01S 3/108*  (2006.01)
  *H01S 3/11*   (2006.01)
  *H01S 3/16*   (2006.01)
  *H01S 3/23*   (2006.01)

(52) U.S. Cl.
  CPC ........ *H01S 3/094092* (2013.01); *H01S 3/108* (2013.01); *H01S 3/1118* (2013.01); *H01S 3/1613* (2013.01); *H01S 3/2316* (2013.01); *H01S 3/06754* (2013.01); *H01S 3/06791* (2013.01); *H01S 2303/00* (2013.01)

(56) References Cited

U.S. PATENT DOCUMENTS

| | | | | |
|---|---|---|---|---|
| 7,519,253 | B2* | 4/2009 | Islam | H01S 5/0064 |
| | | | | 385/122 |
| 8,055,108 | B2* | 11/2011 | Islam | H01S 5/0064 |
| | | | | 385/122 |
| 8,670,642 | B2* | 3/2014 | Islam | H01S 5/0064 |
| | | | | 385/122 |
| 8,731,358 | B2* | 5/2014 | Pare | G02B 6/02023 |
| | | | | 385/126 |
| 9,077,146 | B2* | 7/2015 | Islam | H01S 5/0064 |
| 2014/0329050 | A1* | 11/2014 | Gu | G02B 6/1225 |
| | | | | 428/135 |
| 2015/0008344 | A1* | 1/2015 | Islam | H01S 3/06754 |
| | | | | 250/495.1 |
| 2017/0336258 | A1* | 11/2017 | Islam | H01S 5/0064 |

* cited by examiner

400

500

600

700

800

MID-INFRARED CASCADING FIBER AMPLIFIER AND METHOD FOR AMPLIFICATION THEREOF

RELATED APPLICATIONS

The present application claims priority to and benefit of U.S. Provisional Patent Application No. 62/133,238, filed on Mar. 13, 2015, which is hereby incorporated by reference for all purposes as if set forth herein in its entirety.

TECHNICAL FIELD

The present disclosure is directed to a mid-infrared cascading fiber amplifier, and in particular, to a praseodymium-doped chalcogenide fiber amplifier and fiber laser which increases the power output of the system by overlapping a portion of the power output by the transition from an upper energy level to an intermediate energy level and the power output by the transition from the intermediate energy level to a lower energy level within the cascading amplifier.

BACKGROUND OF THE INVENTION

Mid-infrared light sources are useful in many applications, such as bio sensing, environmental monitoring, homeland security and medical diagnostics. Quantum cascade lasers are often used as such light sources at mid-infrared wavelengths. Commercial tunable quantum cascade lasers are available with an average power that is typically in the range of 10 to 100 mW.

Amplifiers incorporating rare-earth ions are known in the art. Such fiber lasers and amplifiers may be doped with $Tb^{3+}$, $Dy^{3+}$ or $Pr^{3+}$ which possess numerous transitions in the wavelength range from 3-12 µm. A three-level system, by way of example, using a $Dy^{3+}$ doped chalcogenide fiber laser at 3.3 µm and 4.7 µm is known. As a result of the construction, as known from cascading lasers, there are two separate lasing wavelengths resulting from the emissions spectra of the transitions. For the transition from $^6H_{13/2} \rightarrow {}^6H_{15/2}$, the emitted wavelength is ~3.3 µm, and for the transition from $^6H_{11/2} \rightarrow {}^6H_{13/2}$, the emitted wavelength is ~4.7 µm. These emitted wavelengths do not overlap. As a result, an idler at 3.3 µm is required to depopulate the ions in the excited level, and obtains a slope efficiency of only 16% in output power at a wavelength of 4.7 µm, which is a low efficiency.

SUMMARY OF THE INVENTION

The present disclosure is directed to a praseodymium-doped chalcogenide fiber amplifier and fiber laser. An input signal wave having an input power level and input signal wave wavelength is input to the fiber. In response to the input signal, cascaded amplification occurs so that at least a portion of the energy output from a first transition from an upper energy level to an intermediate energy level within the fiber will overlap with the power output of a second transition from the intermediate energy level to a lower energy level within the fiber. A backward pump source outputs a pump wave into the fiber, where the pump wave has a wavelength that is less than the input signal wave wavelength, and the pump wave power level is greater than the input signal wave power level. In response to the pump wave and the input signal, transitions from the lower energy level to the upper energy level occur in the fiber, causing an output signal wave from the fiber having a power level equal to about 45% of the power level of the pump wave.

In an exemplary embodiment, the cascade amplifier includes a $Pr^{3+}$-doped mid-infrared fiber which is backward pumped with a pump wave having a wavelength of about 2 µm. The input to the doped mid-infrared fiber is an input signal wave at a broad wavelength range between 4-5 µm. The backward pump outputs a pump wave near 2 µm to the fiber. As a result, the power of the pump wave is directly transferred from the wavelength near 2 µm to the wavelength range between 4 and 5 µm within the fiber, resulting in up to a 45% slope efficiency in output power.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings may be to scale, but emphasis is placed upon clearly illustrating the principles of the present disclosure. Moreover, in the drawings, like reference numerals designate corresponding parts throughout the several views, and in which.

DETAILED DESCRIPTION OF THE INVENTION

Figure 1:
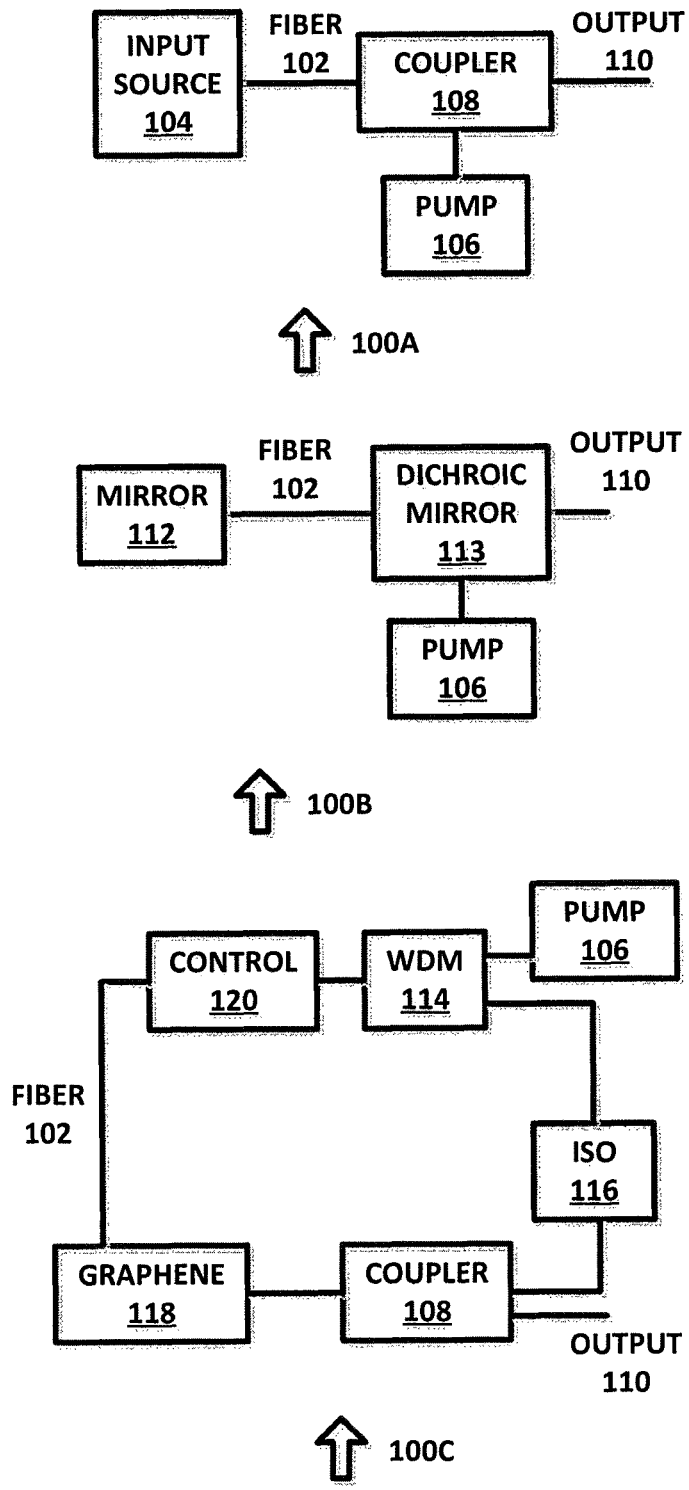
FIG. 1 is a schematic view of a mid-infrared fiber amplifier and mid-infrared fiber lasers constructed in accordance with an exemplary embodiment of the present disclosure.

In the description that follows, like parts are marked throughout the specification and drawings with the same reference numerals. The drawing figures may be to scale and certain components can be shown in generalized or schematic form and identified by commercial designations in the interest of clarity and conciseness.

Fiber lasers are compact and environmentally stable and can generate ultrashort pedestal-free picosecond pulses with a very high repetition rate, a large extinction ratio, and a very low phase noise. One candidate for such a laser in the mid-infrared region is a chalcogenide fiber doped with the rare-earth ion $Pr^{3+}$. It is possible to obtain highly efficient cascaded amplification using a $Pr^{3+}$-doped chalcogenide glass fiber amplifier, and to obtain a gain spectrum in the mid-IR region.

Active mode-locking requires placing a modulator into the laser cavity to induce the amplitude modulation of the light in the cavity. For passive mode-locking, a saturable absorber will selectively attenuate low-intensity light and transmit light of sufficiently high intensity. Passive mode-locking techniques are those that do not require an external signal to the laser to produce pulses. Rather, they use the light in the cavity to cause a change, which will then itself produce a change in the intensity. Graphene, a zero-gap semiconductor, is a unique 2D material that has a nonlinear optical saturable absorption. The linear energy dispersion relationship for graphene provides that there will always be electron-hole pairs in resonance for absorption of optical excitation over a wide spectral range from UV to mid-IR. Graphene-based fiber lasers have been demonstrated in Yb-doped and Er-doped laser systems, and it has been recognized in the present disclosure that graphene is an ideal material to develop a nonlinear optical saturable absorber for mode-locking due to its lower saturation intensity, ultrafast recovery time in the scale of 100 fs, tunable modulation depth, and wide transmission window.

FIG. 1 is a schematic view of a mid-infrared fiber amplifier and mid-infrared fiber lasers constructed in accordance with an exemplary embodiment of the present disclosure. Amplifier 100A includes fiber 102, which can be a $Pr^{3+}$-doped chalcogenide fiber or other suitable materials. Input source 104 provides an input to fiber 102. The input from input source 104 is of a first wavelength. A pump 106 is coupled to fiber 102 by a coupler 108. Pump 106 is a backward pumping pump and inputs a pump wave having a second wavelength to the output end of fiber 102, where the second wavelength is less than the first wavelength. The output 108 of fiber 102 is used to provide the amplified mid-infrared bandwidth light to a suitable system or application.

Straight fiber laser 100B includes fiber 102 and pump 106, dichroic mirror 113, and mirror 112. A semiconductor saturable absorber mirror can be used as the mirror 112. Fiber Bragg grating (FBG) can also be included. Loop fiber laser 100C includes fiber 102, pump 106 and coupler 108, and further includes wave division multiplexer 114, isolator 116, graphene 118 and polarization controller 120.

Figure 2:
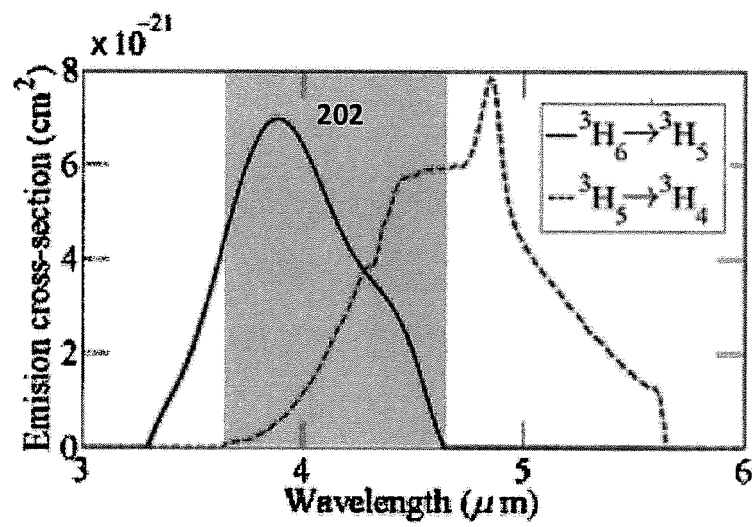
FIG. 2 is a graph of the emission cross-section in response to the input signal wave wavelength showing two distinct transition levels of the cascading amplifier constructed in accordance with an exemplary embodiment of the present disclosure.

FIG. 2 is a graph 200 of the emission cross-section in response to the input signal wave wavelength from input source 104, showing two distinct transition levels of amplifier 100, as constructed in accordance with an exemplary embodiment of the present disclosure. In this exemplary embodiment, fiber 102 is $Pr^{3+}$-doped to provide the energy overlap shown in region 202. In this exemplary embodiment, the input from input source 104 is at a wavelength of 4.5 μm and a suitable power level, such as 10 mW to 100 mW. The threshold power of pump 106 can be as low as 10 mW, but pump 106 power can also be as high as 10 W. Almost 45% of the wave power from pump 106 can be transferred to the higher wavelength range of the input signal wavelength, such as where the input signal wavelength to fiber 102 is between about 4.25 μm and 4.55 μm and preferably 4.5 μm, and the wavelength of pump 106 is between 1.90 μm and 2.3 μm and is preferably 1.95 μm. The corresponding frequencies can be found by applying the formula $c=\lambda f$, where c equals the speed of light or $3\times10^8$ m/s, such that a 4.5 μm wavelength corresponds to a frequency of approximately 66.67 THz, a wavelength of 1.95 μm corresponds to a frequency of approximately 153.85 THz, and so forth.

Figure 3:
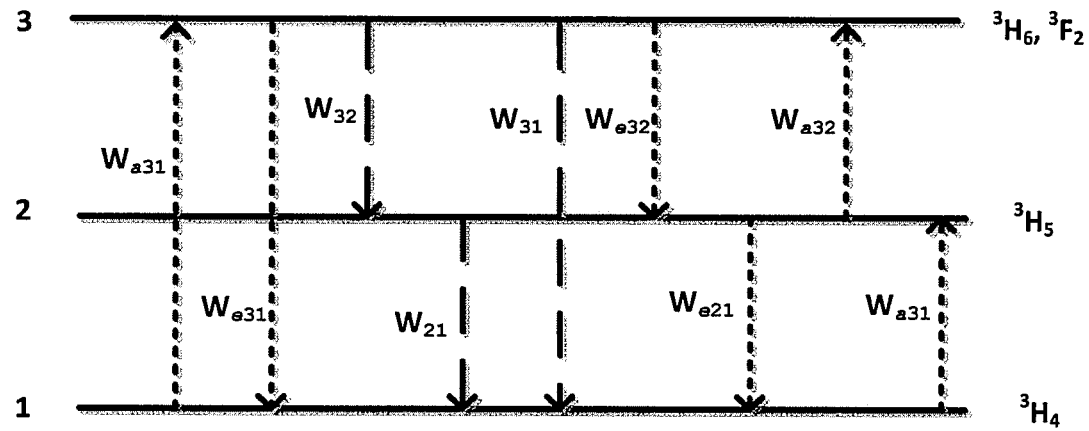
FIG. 3 is an energy level diagram showing three exemplary levels of transition of a cascading $Pr^{3+}$-doped fiber, in accordance with an exemplary embodiment of the present disclosure.

FIG. 3 is an energy level diagram 300 showing three exemplary levels of transition of a cascading $Pr^{3+}$-doped fiber, in accordance with an exemplary embodiment of the present disclosure. Fiber 102 can be implemented using the $Pr^{3+}$-doped fiber, which has a cascaded gain that uses a three-level system to provide a power gain, or other suitable fibers. The output of fiber 102 in this embodiment is generated by transitions from a highest level (level 3) to an intermediate level (level 2), and then from the intermediate level to a lowest level (level 1). In this exemplary embodiment, backwards pump 106 causes fiber 102 to transition from the lowest energy level (level 1) to the highest energy level (level 3), and fiber 102 then transitions from level 3 to level 2 to generate a first emission component and from level 2 to level 1 to generate a second emission component. The rate equation for the three-level system can be described by the following algorithms:

$$\frac{dN_3}{dt} = N_1 W_{a31} + N_2 W_{a32} - N_3(W_{e31} + W_{e32} + W_3),$$

$$\frac{dN_2}{dt} = N_1 W_{a21} - N_2(W_{e21} + W_{a32} + W_{21}) + N_3(W_{e32} + W_{32}),$$

$$N = N_1 + N_2 + N_3,$$

where
    subscript a denotes absorption;
    subscript e denotes emission;
    $N_k$ is the number of ions in respective level k;
    k=1-3; and
    N is the density of $Pr^{3+}$ The steady-state solution for N may be shown by setting $dN_k/dt=0$ and k=1-3. The spontaneous transition probability per unit time between level i and level j is denoted $W_{ij}$, so that the total spontaneous decay rate of level 3 is $W_3=W_{32}+W_{31}$. The lifetime of level j is denoted $\tau_j=1/W_j$. The branching ratio, $\beta_{32}=W_{32}\tau_3$, for the transition from level 3 to level 2 is used to obtain $W_{32}$. Rates are given by:

$$W_{xij} = \Sigma P(\nu)\sigma_{xij}(\lambda)\Gamma(\nu)/Ah\nu$$

where
    x=absorption (a) or emission (e);
    P (ν) is the power;

$\sigma x_{ij}(\nu)$ is the cross-section corresponding to the particular transition (a or e) between levels i and j;

$\Gamma(\nu)$ is the fractional overlap of the mode intensity with the ion-doped core;

A is the mode area; and $\Sigma$ indicates the sum over all the frequencies or wavelengths.

The gain per unit length for frequency $\nu$ is given by:

$$\frac{dP(\nu)}{dz} = [N_i(\nu)\sigma_{xij}(\nu) - N_j(\nu)\sigma_{xij}(\nu)]\Gamma(\nu)P(\nu) + N_i(\nu)\sigma_{xij}\Gamma(\nu)h\nu\Delta\nu - \alpha P(\nu),$$

where the third and fourth terms on the right-hand side are due to amplified spontaneous emission (ASE) noise and fiber loss, respectively. The fiber loss is 1 dB/m. A frequency step of 12 GHz may be used to resolve the ASE spectrum.

The ion $Pr^{3+}$ has a large absorption cross-section at near 2 μm, which corresponds to the output spectra of, for example, $Tm^{3+}$ or $Ho^{3+}$ doped fiber lasers, which have emission spectra of 1.8-2.1 μm. In one exemplary embodiment, an input wavelength of 1.95 μm with an input pump power of 10 W can set as the output of pump 106. The $Pr^{3+}$ ion density can be about $2\times10^{19}$ $cm^3$, which corresponds to 0.1 wt.-% $Pr^{3+}$-doped chalcogenide glass fiber 102. The core diameter and numerical aperture are equal to about 5 μm and 0.3, respectively, which are used to estimate the overlap factor $\Gamma(\nu)$. The backward pumping has a higher slope efficiency than does forward pumping. With backward pumping, the input signal powers are specified at one end of the fiber, and the input powers are specified at the other end. This two-point boundary-value problem is solved iteratively. To obtain convergence, a continuation method may be used in which the pump power is gradually raised to its desired value. ASE noise in both directions is included in our model for both the pump and the signal.

Reference is now again made to graph 200 in which the emission cross-section showing the power emission overlap between the two transition levels in the three-level cascading doped fiber 102 is provided. As seen in graph 200, the solid curve and dashed curve show respectively, the emission cross-sections for the transitions $^3H_6 \rightarrow ^3H_5$ (level 3 to level 2) and $^3H_5 \rightarrow ^3H_4$ (level 2 to level 1). The corresponding absorption cross-sections can be obtained using the McCumber relation. The overlap between the two emission cross-sections are shown as the gray area. Because this process, as shown in graph 200, has both transitions at a wavelength of 4.5 μm, one excited ion will radiate two photons that are coherent with the input signal wave wavelength at 4.5 μm. There is also an emission overlap from about 3.7 micron wavelengths to about 4.75 micron wavelengths with a maximum, greatest efficiency result at about 4.5 micron inputs. As seen from the equation above and accompanying figures, the overlap emission cross sections effectively increase the amplifier efficiency.

Because of fiber loss, the power gain may also be a function of fiber length. In one exemplary embodiment, the length of fiber 102 can be between 2 and 6 meters, such as about 4 meters.

Figure 4:
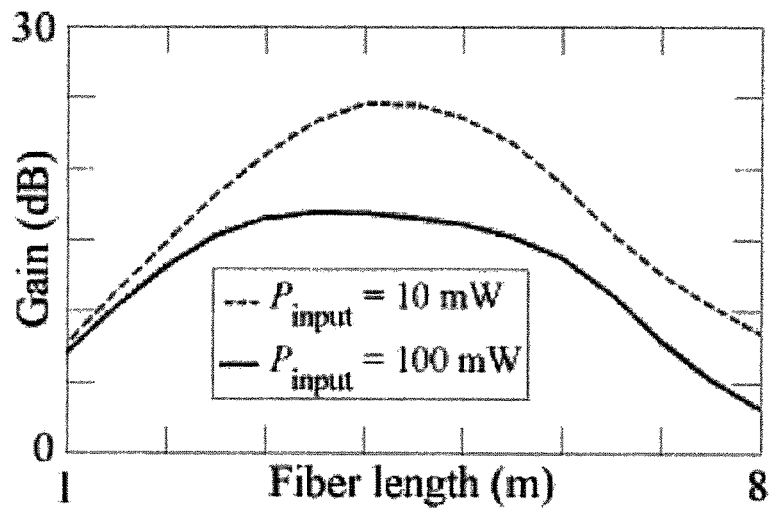
FIG. 4 is a graph showing gain as a function of fiber lengths for two input signals to the mid-infrared fiber amplifier constructed in accordance with an exemplary embodiment of the present disclosure.

FIG. 4 is a graph 400 showing gain as a function of fiber lengths for two input signals to the mid-infrared fiber amplifier constructed in accordance with an exemplary embodiment of the present disclosure. The gain as a function of fiber length for the case where the input signal 4.5 μm is provided. As can be seen, a maximum gain of 16 dB and 25 dB is obtained for an input power of 100 mW and 10 mW, respectively. A slightly longer fiber 102 can be used to obtain the maximum gain when the input signal power is reduced. When the fiber length is less than 3 m, there might not be enough gain to amplify the signal to a maximum result. Similarly, with a fiber length greater than 5 m, the propagation losses can become higher for both the pump and input signal and begin to deteriorate the maximum gain at the preferred wavelength.

Figure 5:
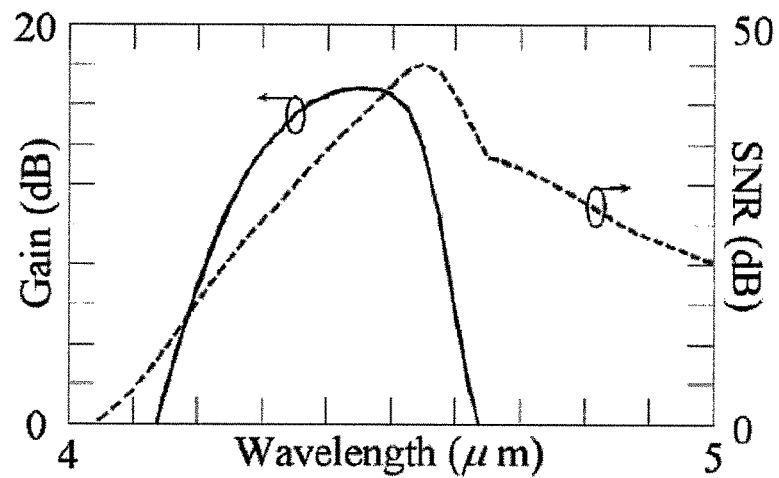
FIG. 5 is a graph showing gain and signal to noise ratio as a function of input signal wave wavelength in accordance with an exemplary embodiment of the present disclosure.

FIG. 5 is a graph 500 showing gain and signal to noise ratio as a function of input signal wave wavelength in accordance with an exemplary embodiment of the present disclosure. The gain and signal to noise ratio (SNR) as a function of wavelength are provided, where the gain is shown by the solid curve and the signal to noise ratio is shown as the dash curve. In this exemplary embodiment, the input signal power is about 100 mW and the fiber length is about 3 m. As can be seen, the maximum gain is about 16 dB at a wavelength of 4.5 μm. The amplifier gain is more than 10 dB in a broad spectrum of 300 nanometers between 4.25 μm and 4.55 μm.

Figure 6:
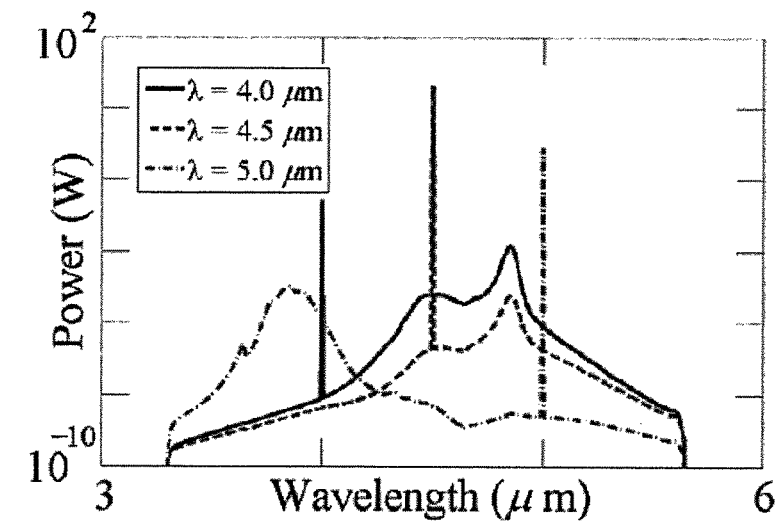
FIG. 6 is a graph of the power output as a function of input signal wave wavelength for three particular wavelengths input into a mid-infrared fiber amplifier constructed in accordance with an exemplary embodiment of the present disclosure.

FIG. 6 is a graph 600 of the power output as a function of input signal wave wavelength for three particular wavelengths input into a mid-infrared fiber amplifier constructed in accordance with an exemplary embodiment of the present disclosure. The power outputs of amplifier 100 for input wavelengths 4.0 μm, 4.5 μm, and 5.0 μm, by way of example, are plotted. A resolution bandwidth of 2 nm is utilized to plot the spectrum. While some amplification occurs when the input signal from input 104 is at 5.0 μm, there is no light to depopulate the uppermost level, level 3 ($^3H_6$), so that amplified spontaneous emission (ASE) noise due to the transition from level 3 to level 2 increases. When the input signal is at 4.0 μm, ASE noise due to the transition from level 2 to level 1 increases. However, in accordance with the present disclosure, when input signal 104 is at 4.5 μm, the signal power depopulates the ions in both levels 3 and 2 as shown in energy level diagram 300, resulting in the maximum cascaded amplification as shown in graph 200 to be amplified by both the transition from level 3 to level 2 and the transition from level 2 to level 1. This amplification occurs simultaneously because of the emission cross section overlap. As a result, the input 10 mW signal is amplified to about 4.5 W, about 45% of the 10 W pump power input by pump 106.

Figure 7:
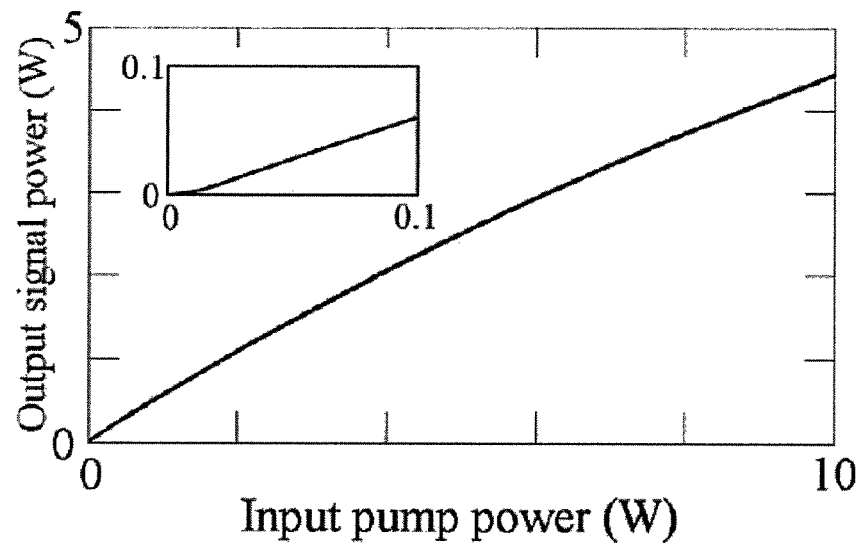
FIG. 7 is a graph of the output signal power as a function of the input pump wave power for inputs into the mid-infrared fiber amplifier constructed in accordance with an exemplary embodiment of the present disclosure.

FIG. 7 is a graph 700 of the output signal power as a function of the input pump wave power for inputs into the mid-infrared fiber amplifier 100 constructed in accordance with an exemplary embodiment of the present disclosure. The output signal power is shown as a function of input power which corresponds to a slope efficiency of around 45%. The improved efficiency of amplifier 100, and the slope efficiency demonstrates the amount of pump power converted to signal power. In the shown embodiment, the input signal wave wavelength is 4.5 μm. The inset shows the output power when the input of pump 106 is between 0 and 0.1 W indicating, a threshold power of 10 mW.

Figure 8:
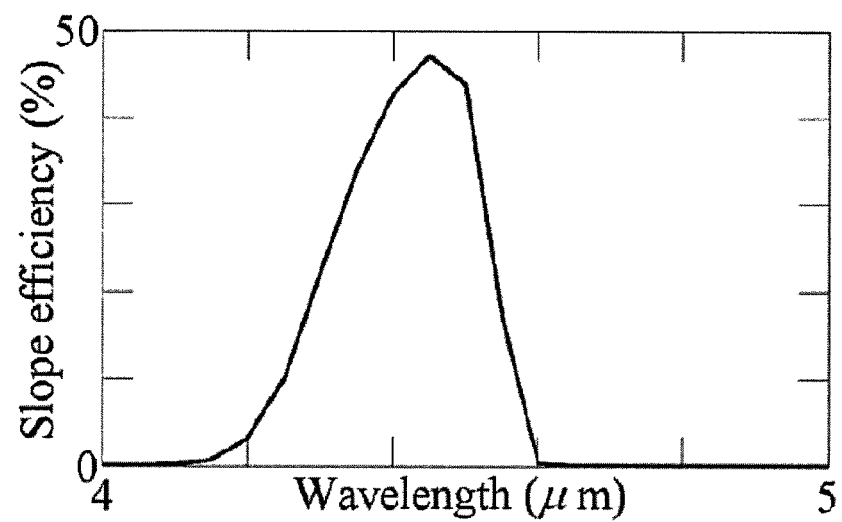
FIG. 8 is a graph of the slope efficiency as a function of the input signal wave wavelength of the mid-infrared fiber amplifier constructed in accordance with an exemplary embodiment of the present disclosure.

FIG. 8 is a graph 800 of the slope efficiency as a function of the input signal wave wavelength of the mid-infrared fiber amplifier constructed in accordance with an exemplary embodiment of the present disclosure. The slope efficiency as a function of wavelength is consistent with the gain shape as a function of input signal wave wavelength as previously shown in graph 500. A maximum efficiency of about 45% is obtained at a wavelength of 4.5 microns. This result shows that almost half of the input pump wave power at 2 μm can be converted to power at 4.5 μm when the input power of the pump wave is 1-2 W or higher. The efficiency of the mid-infrared generation using a fiber amplifier as described above, is thus higher than can be obtained with direct super-continuum generation with a pump input at 2.0 μm because 25% of the pump power can be transferred into the spectral range between 3 and 5 μm.

While the above examples utilize a backward pumping pump 106, a forward pumping pump, pumping at the input of fiber 102 can also or alternatively be used. Forward pumping of fiber 102 can cause fiber 102 to experience transitions from the lowest energy level to the highest energy level, resulting in slope efficiencies lower than the efficiency using backward pumping.

As a result, when utilizing $Pr^{3+}$-doped chalcogenide fiber amplifier as described above, with a backward pumping laser of a second wavelength, less than the input signal of a higher fiber input wavelength, efficiencies can be improved. In one exemplary embodiment, efficiencies can be improved up to 45% utilizing $Pr^{3+}$-doped chalcogenide fiber amplifier having an input signal wavelength of about 4.5 μm with input signal power of 100 mW. High gain and low noise can be achieved simultaneously utilizing the cascaded gain in three-level $Pr^{3+}$ fiber amplifiers designed in accordance with the present disclosure. The slope efficiency may become as high as 45% and the pump threshold is only 10 mW. In this manner, almost half the pump power of the 2 μm pump wave can be shifted to the power at a 4.5 μm wavelength, if pump 106 that produces 1-2 W or higher is used.

In one exemplary embodiment, the fiber can be synthesized using elemental precursors, such as Ge, As, Ga, and Se. A purification process that includes vacuum sublimation and distillation to remove oxide, carbon, and hydrogen related impurities can be used. The elemental precursors Ge, As, Ga, Se, and 1000 ppmw $Pr^{3+}$ can then be batched in a controlled atmosphere glove box into cleaned quartz ampoules and sealed under vacuum ($10^{-5}$ Torr) using an oxy-methane torch. Stable rare-earth doped chalcogenide glass compositions are typically those for which rare-earth has been added in elemental form. Batched sample weights of 8 to 40 g or other suitable sample weights can also or alternatively be used. The glass for the fiber can be melted at 850 degree for 20-30 hours in a rocking furnace. The ampoules can then be immersed in water to quench the glasses, and then the mixture can be annealed at 380 degree for 5 hours. Core rods can then be drawn using the preform method or other suitable methods. Double crucible techniques can be used to fabricate the core cladding fiber. The cladding refractive index can be decreased through substitution of S for Se in the glass composition.

Figure 9:
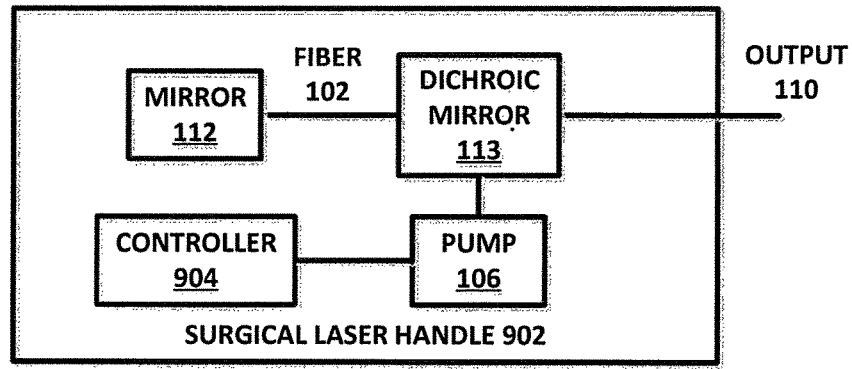
FIG. 9 is a diagram of a surgical laser using a mid-infrared fiber amplifier constructed in accordance with an exemplary embodiment of the present disclosure.

FIG. 9 is a diagram of a surgical laser 900 using a mid-infrared fiber amplifier or fiber laser constructed in accordance with an exemplary embodiment of the present disclosure. In addition to fiber 102, pump 106, mirror 112, dichroic mirror 113, surgical laser housing 902 and controller 904 are provided to allow a surgeon to hold, aim and actuate the laser for surgical purposes, such as cutting tissue. Controller 904 can be a mechanical switch that allows the surgeon to turn surgical laser 900 on or off as needed, a programmable controller that includes one or more hardware and/or software systems that cause surgical laser 900 to execute a sequence of operations that are optimized for a surgical procedure that is not capable of being manually implemented due to timing or other constraints, or other suitable controllers. The mid-IR laser can be tuned to provide optimal tissue cutting and cauterizing effects, which avoids damage to adjacent tissue and bleeding. In this manner, surgical laser 900 overcomes the problems caused by heavier IR lasers, such as $CO_2$ lasers that are larger and more difficult to control due to the weight/complexity of the device.

While the configuration of FIG. 100B is used for this embodiment and other embodiments shown herein, the configurations of FIG. 100A, FIG. 100C or other suitable configuration can be used. While such configurations are not explicitly shown, one of ordinary skill would understand that they could be readily used in place of the exemplary embodiments shown and described.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections.

In general, a software system is a system that operates on a processor to perform predetermined functions in response to predetermined data fields. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

Figure 10:
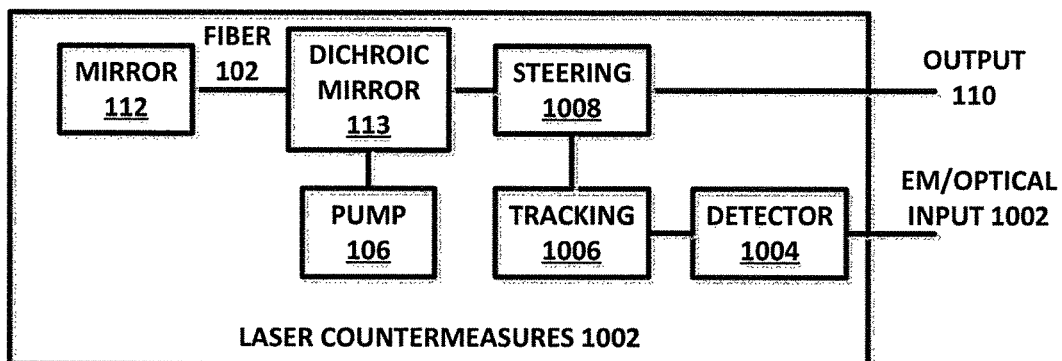
FIG. 10 is a diagram of a laser countermeasure using a mid-infrared fiber amplifier constructed in accordance with an exemplary embodiment of the present disclosure.

FIG. 10 is a diagram of a laser countermeasure system 1000 using a mid-infrared fiber amplifier or fiber laser constructed in accordance with an exemplary embodiment of the present disclosure. Laser countermeasure system 1000 includes laser countermeasures 1002 and fiber 102, pump 106, mirror 112, dichroic mirror 113, output 110, electromagnetic or optical input 1002, detector 1004, tracking 1006 and steering 1008, each of which can be implemented in hardware or a suitable combination of hardware and software.

Infrared countermeasure systems defend the aircraft from infrared-guided missiles by detecting the potential threat and confusing it through the use of strong infrared radiation. Electromagnetic or optical input 1002 receives a suitable environmental input and detects signals associated with an offensive threat. In one exemplary embodiment, electromagnetic or optical input 1002 can detect potential threat by a missile or rocket propelled grenade, radio frequency signals such as radar or other suitable signals. The signals will be transformed into a data format that can be used by other components of laser countermeasure system 1000.

Detector 1004 receives the data output from electromagnetic or optical input 1002 and determines whether a potential threat is present. In one exemplary embodiment, detector 1004 can receive a series of data sets from electromagnetic or optical input 1002 and can analyze differences in the data sets to detect the presence of a potential threat using missile approach warning (MAW) systems based on either pulse-doppler radar, infrared, or ultraviolet. Detector 1004 can also generate location data associated with each detected potential threat or other suitable data.

Tracking 1006 receives location data from detector 1004 and other suitable data and generates tracking data for controlling a location of a laser source. In one exemplary embodiment, tracking 1006 can receive a series of sets of data and can determine a speed, trajectory, predicted future location and other suitable data associated with a potential threat, such as to generate steering system control data.

Steering 1008 receives steering control data from tracking 1006 and steers the output of fiber 102 to a selected location, such as an infrared sensor of a potential threat. In one exemplary embodiment, steering 1008 can include electro-mechanical steering devices, optical steering devices or other suitable devices that can controllably change the position of the laser energy emitted from fiber 102.

Figure 11:
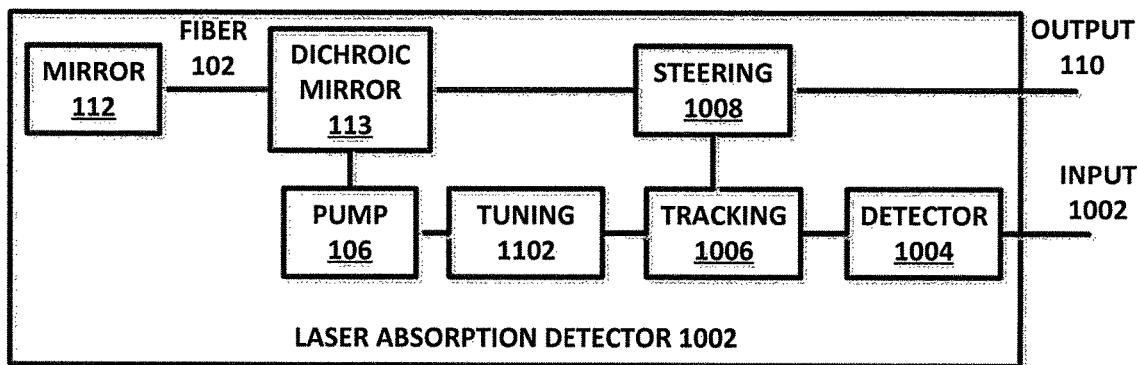
FIG. 11 is a diagram of a laser absorption detector using a mid-infrared fiber amplifier constructed in accordance with an exemplary embodiment of the present disclosure.

FIG. 11 is a diagram of a laser absorption detection system 1000 using a mid-infrared fiber amplifier or fiber laser constructed in accordance with an exemplary embodiment of the present disclosure. Laser absorption detection system 1000 includes laser absorption detector 1002, and fiber 102, pump 106, mirror 112, dichroic mirror 113, output 110, electromagnetic or optical input 1002, detector 1004, tracking 1006, steering 1008 and tuning 1102, each of which can be implemented in hardware or a suitable combination of hardware and software.

Tuning 1102 receives tracking data from tracking 1006 and generates tuning data for pump 106, such as to scan a range of frequencies associated with pathogens, pollutants, explosives or other substances of interest. In one exemplary embodiment, tuning 1102 can be used to implement a search protocol in conjunction with detector 1004, tracking 1006 and steering 1008, which can be used to scan a predetermined area or volume for substances of interest, such as a passenger, a vehicle, a building, a vapor trail, an exhaust plume or other suitable areas of interest.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A mid-infrared cascading fiber amplifier device comprising:
    a source configured to generate a first electromagnetic wave output at a first frequency;
    a fiber coupled to the source; and
    a pump coupled to the fiber and configured to generate a second electromagnetic wave output at a second frequency, wherein the second frequency is higher than the first frequency and causes the fiber to undergo two or more transitions in response to stimulation by the second electromagnetic wave output at the second frequency, wherein the first transition generates the first electromagnetic wave output approximately at the first frequency and the second transition generates the first electromagnetic wave output approximately at the first frequency.

2. The mid-infrared cascading fiber amplifier device of claim 1 wherein the fiber comprises $Pr^{3+}$-doped fiber.

3. The mid-infrared cascading fiber amplifier device of claim 1 wherein the fiber comprises $Pr^{3+}$-doped chalcogenide fiber.

4. The mid-infrared cascading fiber amplifier device of claim 1 wherein the pump comprises a backward pump source.

5. The mid-infrared cascading fiber amplifier device of claim 1 wherein the first frequency generates a wavelength that ranges from approximately 4 to approximately 5 micrometers.

6. The mid-infrared cascading fiber amplifier device of claim 1 wherein the second frequency has a wavelength that ranges from approximately 1.90 to approximately 2.3 micrometers.

7. The mid-infrared cascading fiber amplifier device of claim 1 further comprising a semiconductor saturable absorber mirror.

8. The mid-infrared cascading fiber amplifier device of claim 1 further comprising a nonlinear optical saturable absorber.

9. The mid-infrared cascading fiber amplifier device of claim 1 further comprising a graphene nonlinear optical saturable absorber.

10. A method for amplifying an output of a mid-infrared fiber comprising:
generating an input signal wave having approximately a first wavelength and providing the input signal wave to a fiber that is configured to transition from an upper energy level to an intermediate energy level to generate a first output having a wavelength of approximately the first wavelength output and to transition from the intermediate energy level to a lower energy level to generate a second output having approximately the first wavelength output in response to the input signal wave; and
pumping the fiber with a pump wave having approximately a second wavelength, the second wavelength being less than the first wavelength, to cause a transition from the lower energy level to the upper energy level.

11. The method of claim 10 wherein generating the input signal wave having approximately the first wavelength and providing the input signal wave to the fiber comprises providing the input signal wave to a $Pr^{3+}$-doped fiber.

12. The method of claim 10 wherein generating the input signal wave having approximately the first wavelength and providing the input signal wave to the fiber comprises providing the input signal wave to a $Pr^{3+}$-doped chalcogenide fiber.

13. The method of claim 10 wherein pumping the fiber comprises using a backward pump source.

14. The method of claim 10 wherein the first frequency generates a wavelength that ranges from approximately 4 to approximately 5 micrometers.

15. The method of claim 10 wherein the second frequency generates a wavelength that ranges from approximately 1.90 to approximately 2.3 micrometers.

16. The method of claim 10 further comprising appending a semiconductor saturable absorber mirror.

17. The method of claim 10 further comprising appending a nonlinear optical saturable absorber to the fiber.

18. The method of claim 10 further comprising appending a graphene nonlinear optical saturable absorber to the fiber.

19. In a mid-infrared cascading fiber amplifier device having a source configured to generate a first electromagnetic wave output at a first frequency, a fiber coupled to the source and a pump coupled to the fiber and configured to generate a second electromagnetic wave output at a second frequency, wherein the second frequency is higher than the first frequency and causes the fiber to undergo two or more transitions in response to stimulation by the second electromagnetic wave output at the second frequency, wherein the first transition generates the first electromagnetic wave output approximately at the first frequency and the second transition generates the first electromagnetic wave output approximately at the first frequency, wherein the fiber comprises $Pr^{3+}$-doped chalcogenide fiber, the pump comprises a backward pump source, the first frequency generates a first wavelength that ranges from approximately 4 to approximately 5 micrometers, the second frequency generates a second wavelength that ranges from approximately 1.90 to approximately 2.3 micrometers, the mid-infrared cascading fiber laser device having a semiconductor saturable absorber mirror and a graphene nonlinear optical saturable absorber, a method comprising:
generating an input signal wave having approximately the first wavelength and providing the input signal wave to the fiber that is configured to transition from an upper energy level to an intermediate energy level to generate a first output having a wavelength of approximately the first wavelength and the transition from the intermediate energy level to a lower energy level to generate a second output having approximately the first wavelength in response to the input signal wave;
pumping the fiber with a pump wave having approximately the second wavelength, to cause a transition from the first energy level to the second energy level, and to output an output wave in response thereto, the output wave having approximately the first wavelength;
wherein generating the input signal wave having approximately the first wavelength and providing the input signal wave to the fiber comprises providing the input signal wave to a $Pr^{3+}$-doped chalcogenide fiber;
appending a semiconductor saturable absorber mirror to the fiber;
appending a nonlinear optical saturable absorber to the fiber; and
appending a graphene nonlinear optical saturable absorber to the fiber.

* * * * *